(12) United States Patent
Lee et al.

(10) Patent No.: US 12,259,602 B2
(45) Date of Patent: Mar. 25, 2025

(54) DISPLAY PANEL SUBSTRATE DEFINING HOLE FOR INPUT IMAGE DEVICE AND LIQUID CRYSTAL DISPLAY HAVING THE SAME

(71) Applicant: Samsung Display Co., Ltd., Yongin (KR)

(72) Inventors: Tae Hee Lee, Asan-si (KR); Hyoung Joon Kim, Cheonan-si (KR); Hyo Jin Kim, Daegu (KR); Kap Soo Yoon, Seoul (KR); Jeong Uk Heo, Asan-si (KR); Ji Yun Hong, Seoul (KR)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/333,684

(22) Filed: Jun. 13, 2023

(65) Prior Publication Data
US 2023/0324722 A1    Oct. 12, 2023

Related U.S. Application Data

(63) Continuation of application No. 17/520,829, filed on Nov. 8, 2021, now Pat. No. 11,719,962, which is a
(Continued)

(30) Foreign Application Priority Data

Sep. 11, 2015   (KR) .................. 10-2015-0129027

(51) Int. Cl.
    *G02F 1/01*     (2006.01)
    *G02F 1/13*     (2006.01)
(Continued)

(52) U.S. Cl.
    CPC .......... *G02F 1/0107* (2013.01); *G02F 1/1303* (2013.01); *G02F 1/133345* (2013.01);
(Continued)

(58) Field of Classification Search
    CPC .................. G02F 1/1303; G02F 1/133345
    See application file for complete search history.

(56) References Cited

U.S. PATENT DOCUMENTS

| 4,917,481 A | 4/1990 | Koechner |
| 5,278,685 A | 1/1994 | Iwamoto et al. |

(Continued)

FOREIGN PATENT DOCUMENTS

| JP | H05-119292 A | 5/1993 |
| KR | 1020050050793 | 6/2005 |

(Continued)

OTHER PUBLICATIONS

Korean Notice of Allowance—Korean Application No. 10-2022-0041587 dated Apr. 20, 2022.

*Primary Examiner* — Lauren Nguyen
(74) *Attorney, Agent, or Firm* — CANTOR COLBURN LLP

(57) ABSTRACT

A liquid crystal display includes a first substrate including: a display area including a plurality of pixels on the first substrate, a non-display area which is disposed on an outside of the display area and in which a dummy wire is disposed on the first substrate, and an image input hole which is defined therein in the non-display area and in which an image input device is disposed, a second substrate facing the first substrate and including a display area and a non-display area corresponding to those of the first substrate, a liquid crystal layer interposed between the first and second substrates, and a sealant which is in the non-display area of the first and second substrates and seals the liquid crystal layer (Continued)

between the first and second substrates. The dummy wire is disposed near the image input hole.

20 Claims, 18 Drawing Sheets

Related U.S. Application Data continuation of application No. 16/564,050, filed on Sep. 9, 2019, now Pat. No. 11,169,401, which is a continuation of application No. 14/996,326, filed on Jan. 15, 2016, now Pat. No. 10,437,113.

(51) Int. Cl.
  *G02F 1/133* (2006.01)
  *G02F 1/1333* (2006.01)
  *G02F 1/1335* (2006.01)
  *G02F 1/1339* (2006.01)
  *G02F 1/1341* (2006.01)
  *G02F 1/1343* (2006.01)

(52) U.S. Cl.
  CPC .. *G02F 1/133509* (2013.01); *G02F 1/133512* (2013.01); *G02F 1/133514* (2013.01); *G02F 1/1339* (2013.01); *G02F 1/13394* (2013.01); *G02F 1/1341* (2013.01); *G02F 1/134309* (2013.01); *G02F 1/13312* (2021.01); *G02F 1/133322* (2021.01); *G02F 1/133325* (2021.01); *G02F 1/133388* (2021.01); *G02F 1/13398* (2021.01)

(56) References Cited

U.S. PATENT DOCUMENTS

| | | | |
|---|---|---|---|
| 9,360,728 B2 | 6/2016 | Kang et al. | |
| 2009/0066903 A1 | 3/2009 | Yoshida | G02F 1/1339 349/153 |
| 2009/0128766 A1 | 5/2009 | Kawamura | G02F 1/133345 349/139 |
| 2012/0092606 A1 | 4/2012 | Tai | H01L 27/1214 349/141 |
| 2013/0258234 A1 | 10/2013 | Park | G02F 1/133512 349/58 |
| 2014/0063407 A1* | 3/2014 | Kwon | G02F 1/1339 349/106 |
| 2014/0307219 A1* | 10/2014 | Cho | G02F 1/1339 349/190 |
| 2014/0354591 A1* | 12/2014 | Chu | G06F 3/0446 345/174 |

FOREIGN PATENT DOCUMENTS

| | | | | |
|---|---|---|---|---|
| KR | 1020110119527 | 11/2011 | | |
| KR | 1020120100285 | 9/2012 | | |
| KR | 1020120106103 | 9/2012 | | |
| KR | 10-201300880108 | 8/2013 | ............. | B23K 20/00 |
| KR | 2013-0088108 | 8/2013 | ............. | H01L 51/52 |
| KR | 1020150012517 A | 2/2015 | | |
| KR | 1020150028455 A | 3/2015 | | |
| KR | 1020150043699 A | 4/2015 | | |
| KR | 1020150058655 A | 5/2015 | | |

* cited by examiner

[FIG 1]
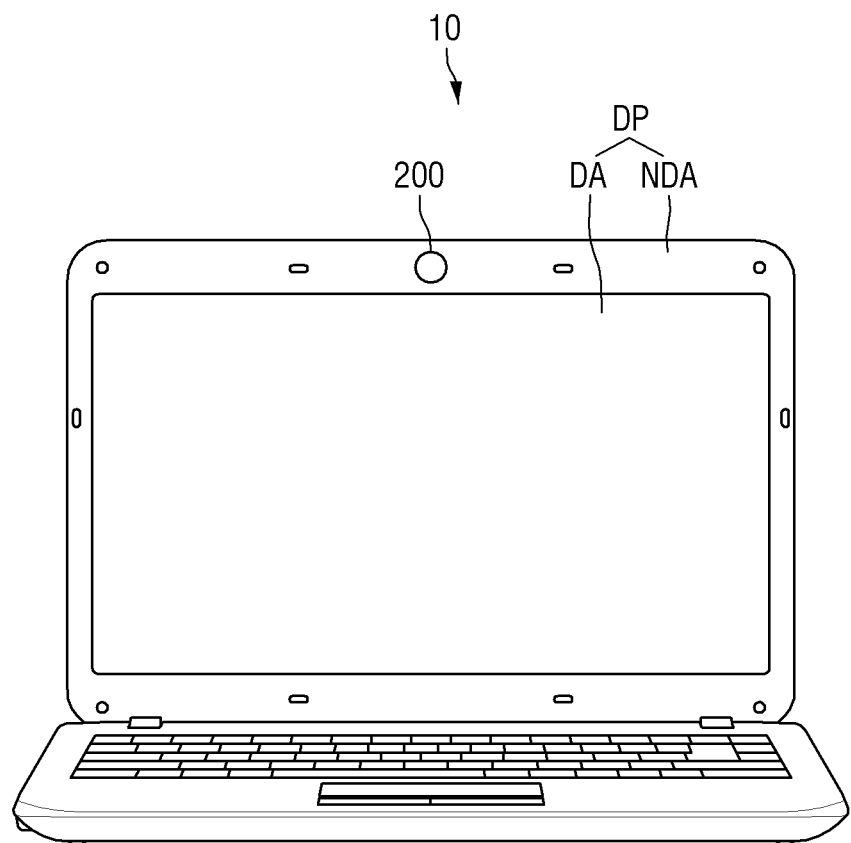

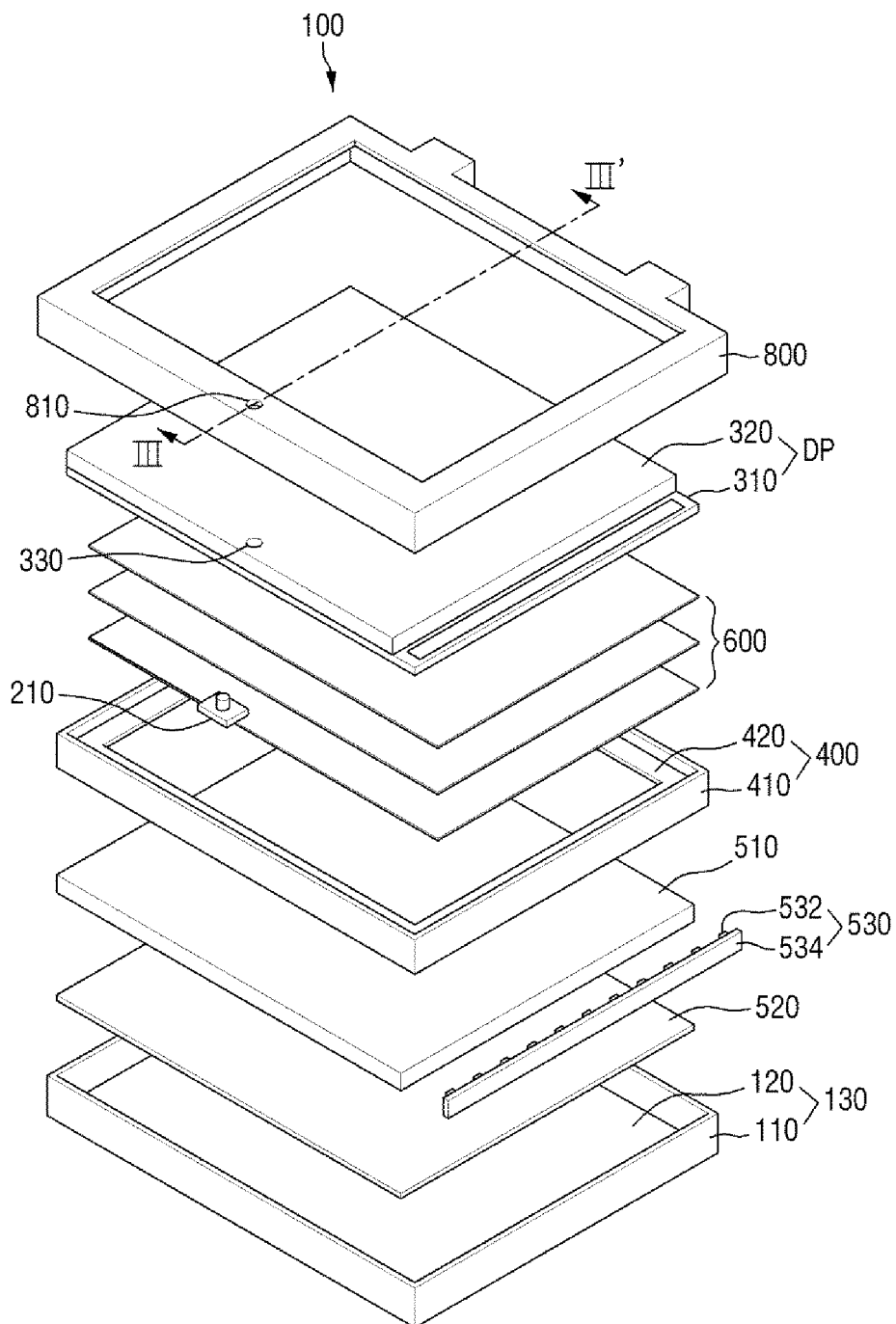
[FIG 2]

[FIG 3]
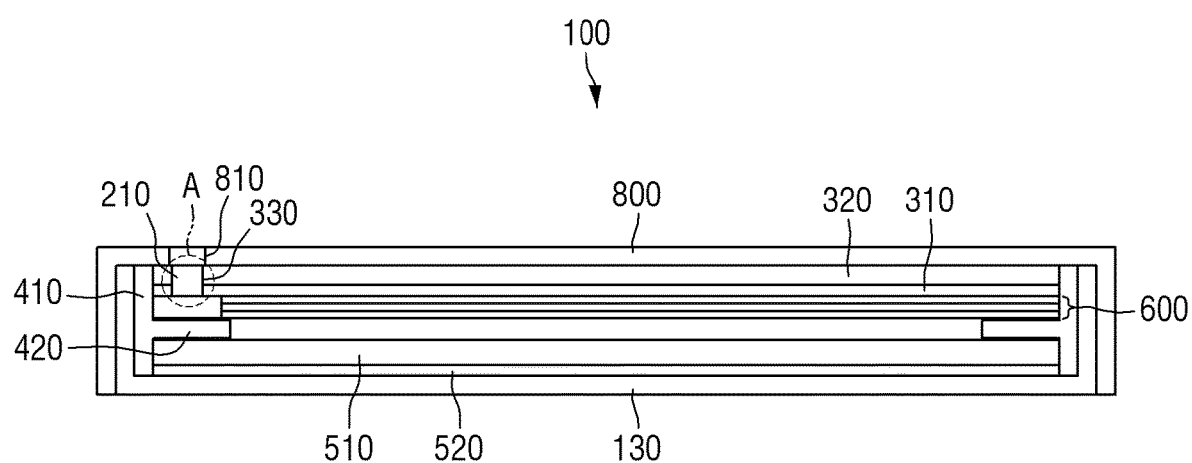

[FIG 4]
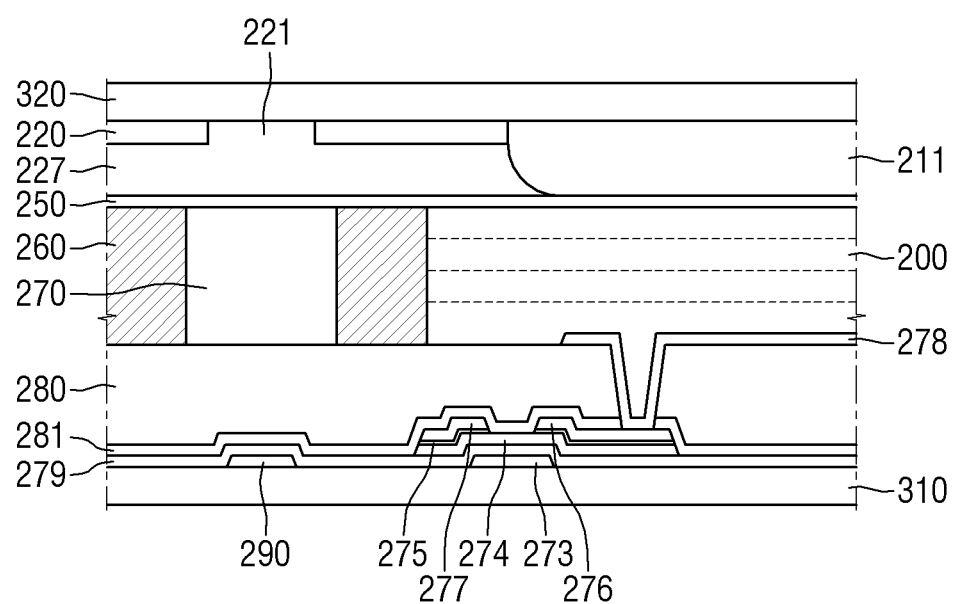

[FIG 5]
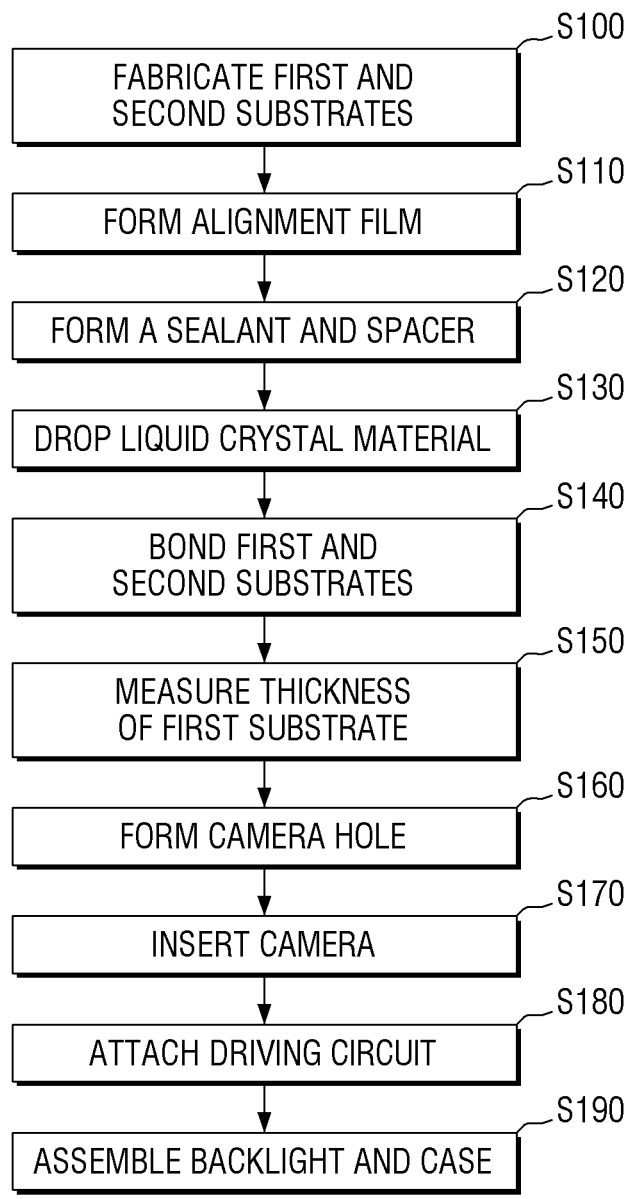

[FIG 6]
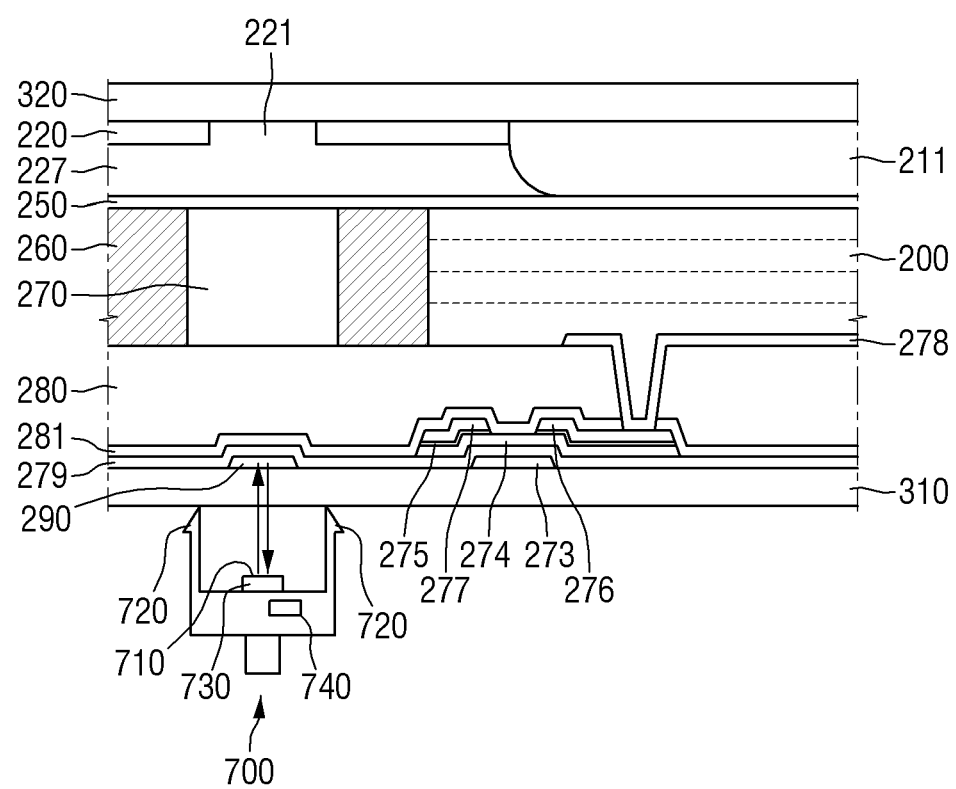

[FIG 7]
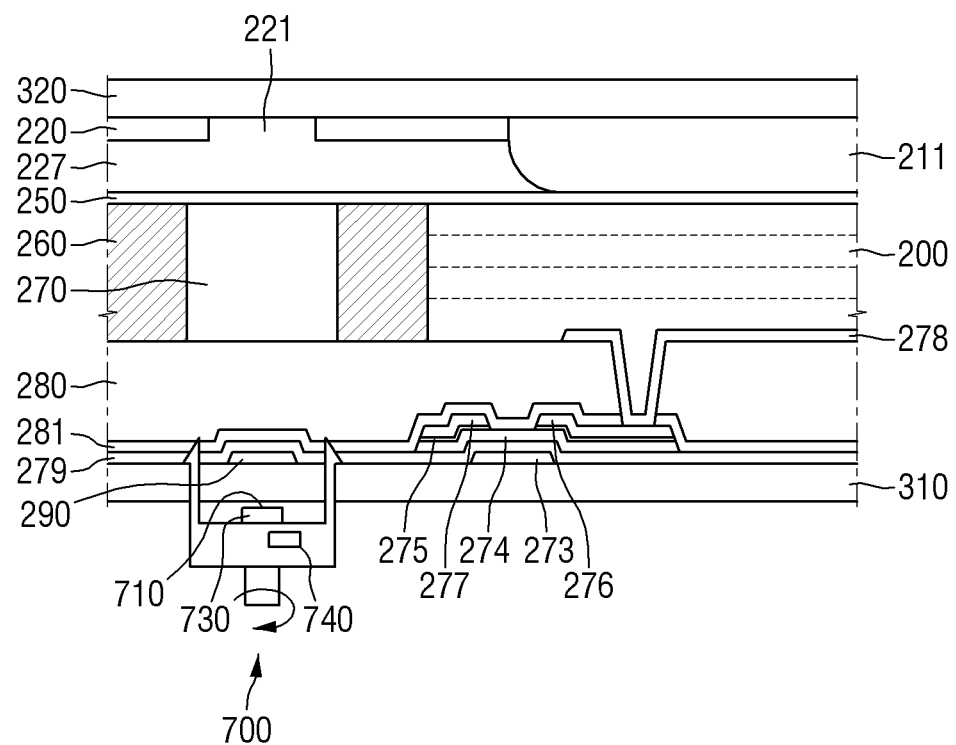

[FIG 8]
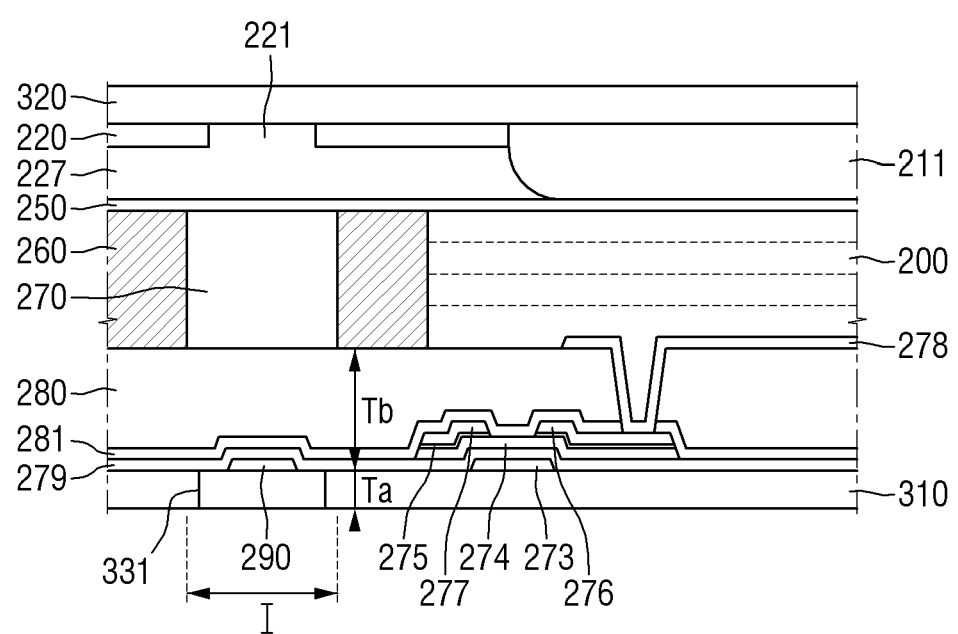

[FIG 9]
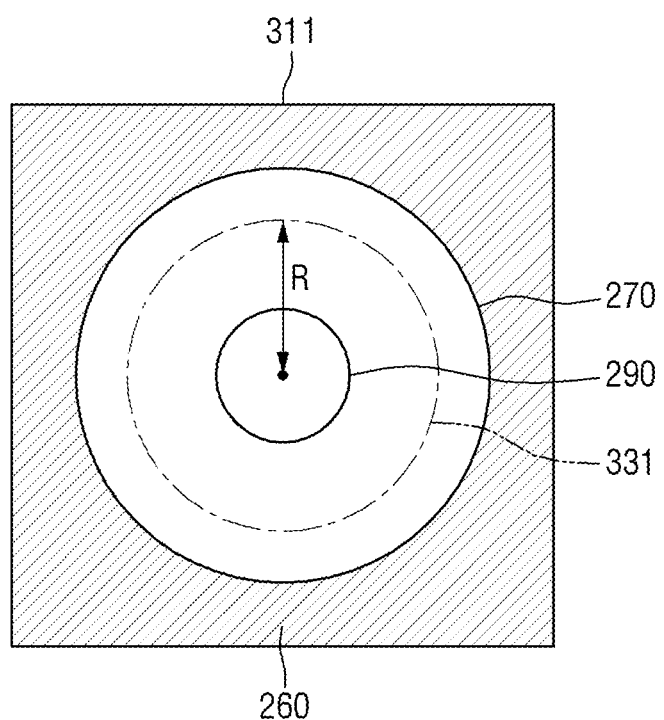

[FIG 10]
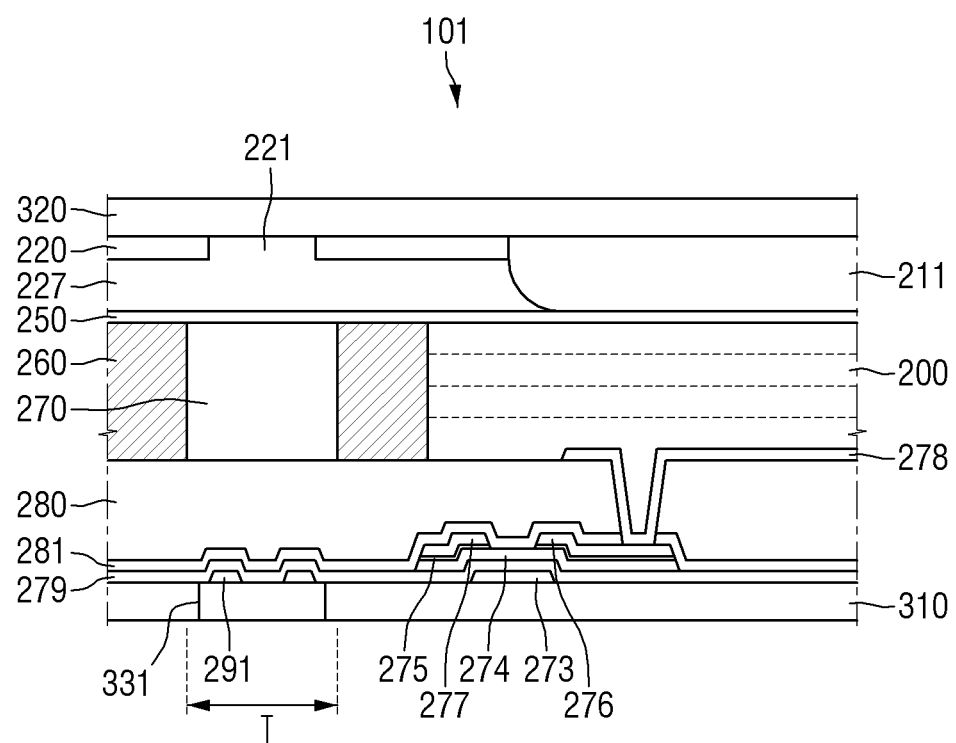

[FIG 11]
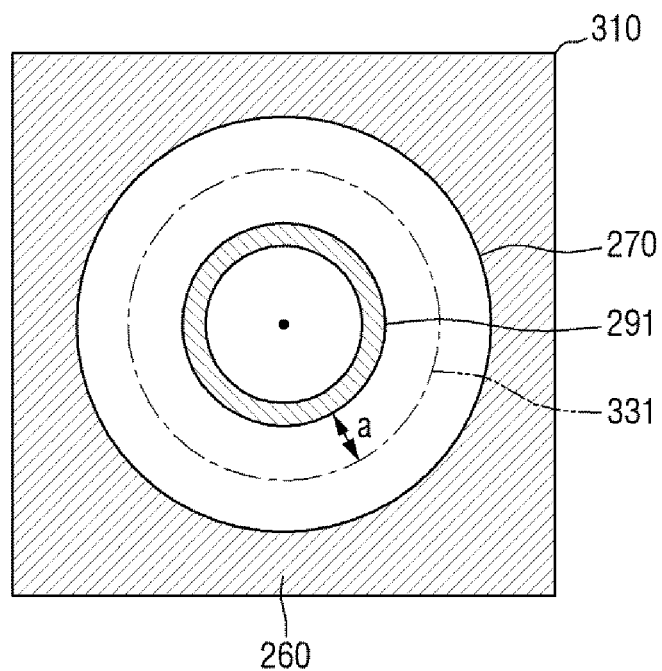

[FIG 12]
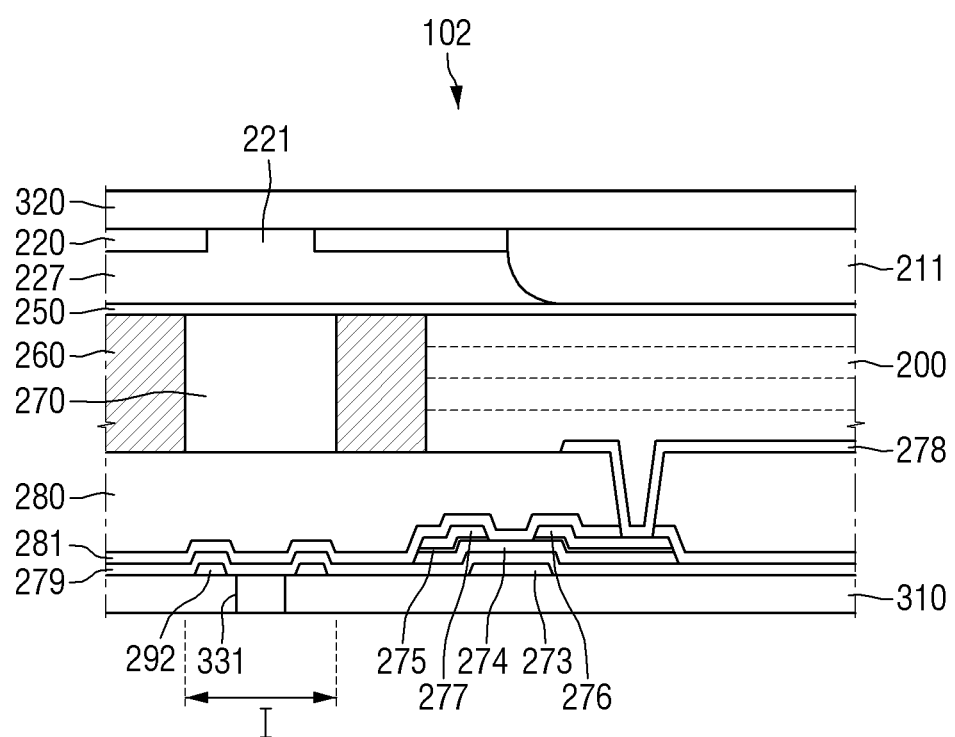

[FIG 13]
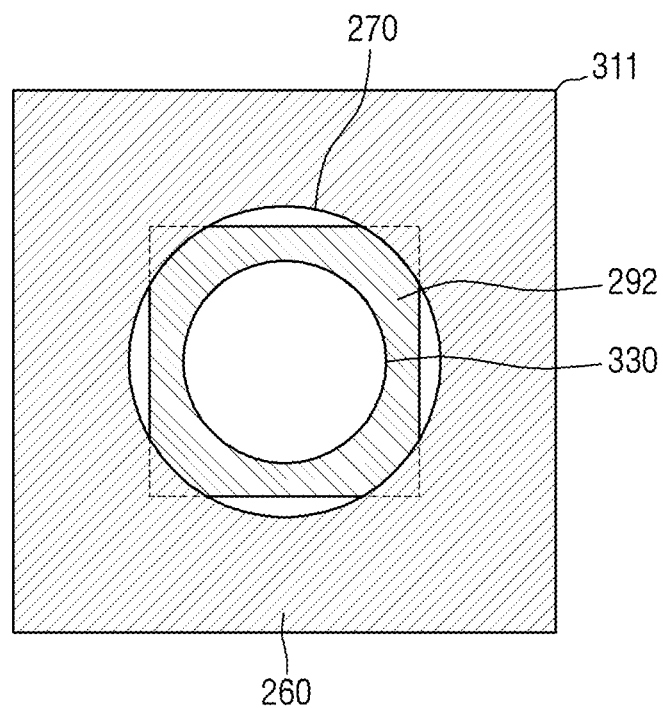

【FIG 14】
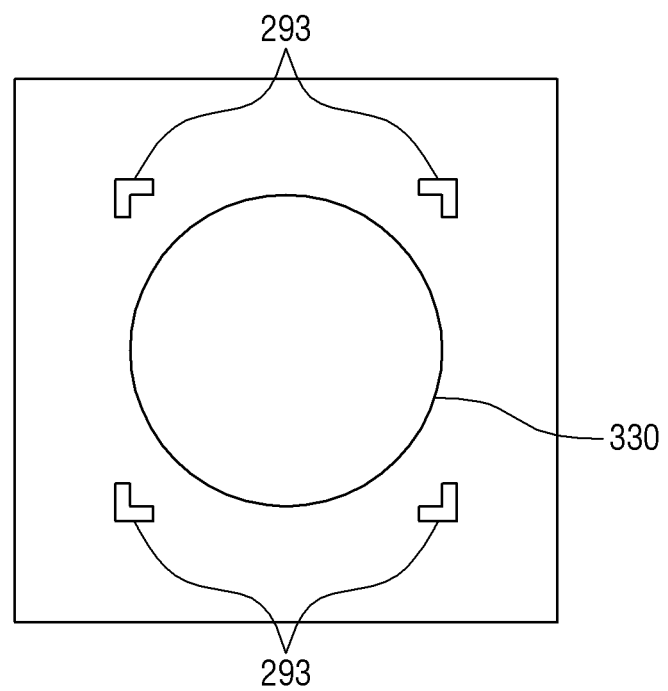

[FIG 15]
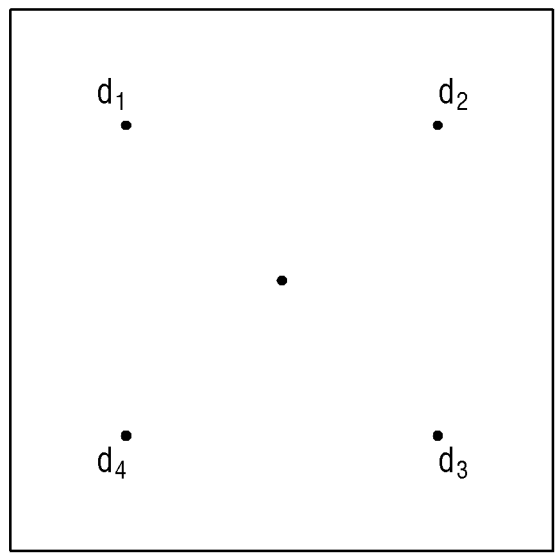

[FIG 16]
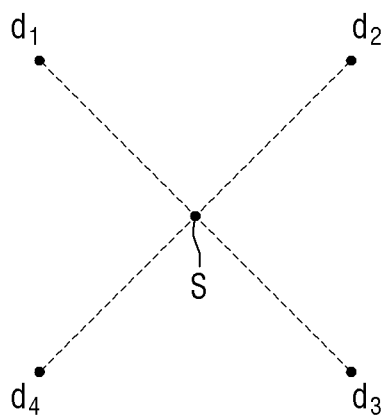

[FIG 17]
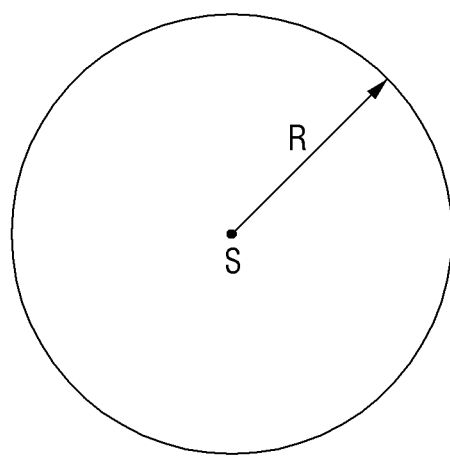

[FIG 18]
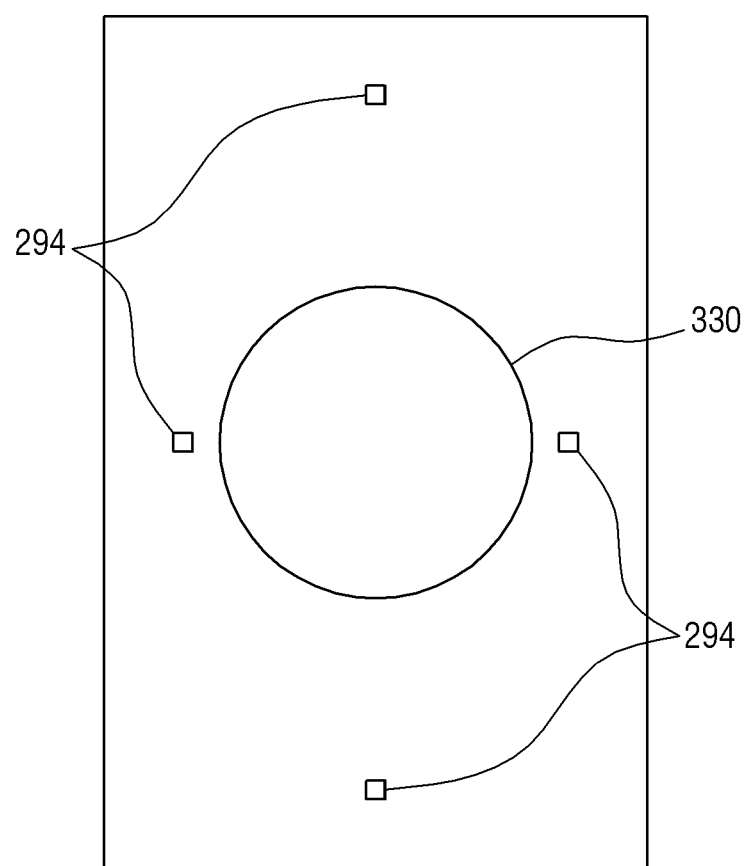

DISPLAY PANEL SUBSTRATE DEFINING HOLE FOR INPUT IMAGE DEVICE AND LIQUID CRYSTAL DISPLAY HAVING THE SAME

This application is a continuation application of U.S. application Ser. No. 17/520,829 filed Nov. 8, 2021, which is a continuation application of U.S. application Ser. No. 16/564,050 filed Sep. 9, 2019 and issued as U.S. Pat. No. 11,169,401 on Nov. 9, 2021, which is a continuation application of U.S. application Ser. No. 14/996,326 filed Jan. 15, 2016 and issued as U.S. Pat. No. 10,437,113 on Oct. 8, 2019, which claims priority to Korean Patent Application No. 10-2015-0129027 filed on Sep. 11, 2015, and all the benefits accruing therefrom under 35 U.S.C. § 119, the content of which in its entirety is herein incorporated by reference.

BACKGROUND

1. Field

The invention relates to a liquid crystal display ("LCD"), and more particularly, to an LCD with an image input device such as a camera embedded therein.

2. Description of the Related Art

Various flat panel-type display devices have been developed. Liquid crystal displays ("LCDs"), among other flat panel-type display devices, have been widely used in various fields such as notebook computers, monitors, televisions ("TVs"), and the like because of their numerous advantages such as high contrast ratio, suitableness for displaying moving images, low power consumption, etc.

An LCD includes as one of its essential elements a liquid crystal display panel in which a first substrate for driving liquid crystal molecules and a second substrate for realizing colors are bonded together with a liquid crystal layer interposed therebetween. The LCD changes the alignment direction of the liquid crystal molecules by generating an electric field therein, and thus causes a variation in light transmittance through the liquid crystal display panel.

SUMMARY

Exemplary embodiments of the invention provide a liquid crystal display ("LCD") including an image input hole defined in a first substrate of the LCD for the installation of an image input device such as a camera lens, so as to reduce an overall thickness of the LCD.

Exemplary embodiments of the invention also provide an LCD in which an image input hole can be formed in a first substrate of the LCD without causing damage to a second substrate of the LCD that faces the first substrate.

Exemplary embodiments of the invention also provide a method of forming an image input hole in a first substrate of an LCD, which is capable of improving the defect rate during the formation of the image input hole by determining a total thickness of a first substrate and then forming the image input hole.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a LCD includes a first substrate including a display area in which an image is displayed, the display area including a plurality of pixels, a non-display area which is disposed on an outside of the display area and in which the image is not displayed, the non-display area including a dummy wire on the first substrate, and an image input hole which is defined therein in the non-display area and in which an image input device is disposed, a second substrate facing the first substrate and including a display area corresponding to the display area of the first substrate and in which the image is displayed, and a non-display area corresponding to the non-display area of the first substrate and in which the image is not displayed, a liquid crystal layer interposed between the first and second substrates, and a sealant which is in the non-display area of the first and second substrates and seals the liquid crystal layer between the first and second substrates. The dummy wire is disposed near the image input hole.

Also, the LCD includes a spacer which may be in the non-display area of the first and second substrates and maintains a gap between the first and second substrates. In an area where the image input hole is disposed, the spacer may be disposed between the first and second substrates, and the sealant may be disposed to surround the spacer. The spacer may include a transparent material and the dummy wire may include aluminum, silver or copper. The dummy wire may be disposed adjacent to an outer edge of the image input hole. The dummy wire may form a closed curve around the image input hole.

Also, the dummy wire may be provided in plural. The plurality of dummy wires may be spaced from one another by a predetermined distance. Among the plurality of dummy wires, with respect to the image input hole, two opposite dummy wires may be spaced from a center of the image input hole by a same distance, and two non-opposite dummy wires may be spaced from the center of the image input hole by different distances. Among the plurality of dummy wires, each of two different dummy wires are spaced from a center of the image input hole by a same distance.

Also, the display area may further include gate wiring which is on the first substrate and through which signals for driving the pixels are transmitted. The dummy wire may be disposed in a same layer as the gate wiring among layers disposed on the first substrate. The display area may further include data wiring which is on the first substrate and through which signals for driving the pixels are transmitted. The dummy wire may be in a same layer as the data wiring among layers disposed on the first substrate.

Also, the LCD may further include a light-shielding pattern disposed on the second substrate in the non-display area thereof. The light-shielding pattern may not overlap the image input hole.

According to another exemplary embodiment of the invention, a method of fabricating an LCD is provided. A method of fabricating an LCD includes: disposing a dummy wire on a first substrate in a non-display area thereof; placing the first substrate including the dummy wire thereon to face a color filter substrate and bonding the first substrate including the dummy wire thereon and the color filter substrate together; irradiating a laser beam toward the dummy wire on the first substrate from outside the first substrate; measuring a laser beam reflected from the dummy wire on the first substrate; calculating a thickness of the first substrate based on the reflected laser beam; forming an incision in the first substrate including the dummy wire thereon to a depth corresponding to the calculated thickness of the first substrate, using an incising tool; and forming an image input hole in the first substrate and corresponding to the incision and in which an image input device is disposed.

The disposing the dummy wire provides the dummy wire in plural on the first substrate. For the plural dummy wires, the measuring the reflected laser beam includes measuring a plurality of laser beams respectively reflected from the plurality of dummy wires to determine locations of the plurality of dummy wires, and based on the plurality of reflected laser beams, determining a location of a center of the image input hole to be formed in the first substrate.

For the plural dummy wires, the determining the location of the center of the image input hole to be formed in the first substrate includes marking dots at the locations of the plurality of dummy wires, generating lines each connecting two diagonally opposite dots, and determining an intersection between the generated lines as being the location of the center of the image input hole to be formed in the first substrate The forming the incision in the first substrate includes rotating the incising tool about the location of the center of the image input hole to be formed in the first substrate.

The forming the incision in the first substrate includes locating edges of the incising tool a predetermined distance apart from the center of the image input hole and inserting the incising tool into the first substrate and rotating the incising tool about the location of the center of the image input hole to be formed in the first substrate.

Also, the forming the incision in the first substrate may include rotating the incising tool about the center of the image input hole to be formed in the first substrate and the forming the image input hole which is in the first substrate includes removing a portion of the first substrate which is defined by the incision.

Also, the forming the image input hole which is in the first substrate may include attaching an adhesive member to a portion of the first substrate which is defined by the incision and performing a separation process by applying a force to the adhesive member so as to remove the portion of the first substrate in the incision from a remaining portion of the first substrate outside the incision.

According to one or more of the exemplary embodiments, it is possible to improve the defect rate during the formation of an image input hole in a first substrate of a display panel without a requirement of additional processes in manufacturing an LCD.

In addition, it is possible to easily determine a place in which to form the image input hole and to precisely form the image input hole to a particular depth in the first substrate.

Moreover, it is possible to easily determine a place in which to form the image input hole by measuring an actual thickness of the first substrate, and thus shorten the manufacturing process of an LCD.

Other features and exemplary embodiments will be apparent from the following detailed description, the drawings, and the claims.

BRIEF DESCRIPTION OF THE DRAWINGS

The above and other advantages and features of this disclosure will become more apparent by describing in further detail exemplary embodiments thereof with reference to the accompanying drawings, in which:

FIG. 1 is a perspective view illustrating an exemplary embodiment of a notebook computer application of a liquid crystal display ("LCD") according to the invention.

FIG. 2 is an exploded perspective view of an exemplary embodiment of LCD according to the invention.

FIG. 3 is a cross-sectional view taken along line III-III' of FIG. 2.

FIG. 4 is an enlarged cross-sectional view of a display panel of FIG. 2 before the formation of a camera hole in area A of FIG. 3.

FIG. 5 is a flowchart illustrating an exemplary embodiment of a manufacturing method of an LCD, according to the invention.

FIGS. 6 to 8 are cross-sectional views illustrating processes of an exemplary embodiment of a method of forming a camera hole according to the invention.

FIG. 9 is a bottom plan view of a display panel of FIG. 8.

FIGS. 10 and 11 are a cross-sectional view and a bottom plan view, respectively, of another exemplary embodiment of a display panel according to the invention.

FIGS. 12 and 13 are a cross-sectional view and a bottom plan view, respectively, of still another exemplary embodiment of a display panel according to the invention.

FIG. 14 is a plan view of yet another exemplary embodiment of a display panel according to the invention.

FIGS. 15 to 17 are schematic views illustrating an exemplary embodiment of a process of recognizing a center of a camera hole with respect to a display panel of FIG. 14 based on the locations of the third dummy wires.

FIG. 18 is a plan view of yet another exemplary embodiment of a display panel according to the invention.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross-section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

There has been a trend to install a camera lens in a liquid crystal display ("LCD") and thus to realize an LCD equipped with an image pickup function. An LCD including a camera lens may be implemented by disposing a hole in a case into which a liquid crystal display panel and a backlight are assembled and inserting the camera lens into the hole. With the camera lens inserted in the hole of the case, an overall thickness of the case may undesirably increase. Therefore, increasing attention is being drawn to installing a camera lens in a liquid crystal display panel such as by disposing a hole in the liquid crystal display panel.

FIG. 1 is a perspective view illustrating an exemplary embodiment of a notebook computer application of a liquid crystal display ("LCD") according to the invention.

More specifically, FIG. 1 illustrates an application of an LCD as part of a notebook computer 10, but the invention is not limited thereto. One or more exemplary embodiment of the LCD according to the invention is applicable to various electronic devices, other than the notebook computer 10, such as a personal computer ("PC"), a mobile terminal, a television ("TV"), and the like. The notebook computer 10 is illustrated in FIG. 1 as having a display panel DP thereof exposed.

Referring to FIG. 1, the notebook computer 10 includes the display panel DP and an image pickup unit 200. When viewed in a plan view, the display panel DP is divided into a display area DA in which an image is displayed and a non-display area NDA which surrounds the display area DA and in which no image is displayed. A pixel area may be provided in plural in the display area DA. Each pixel area may include a pixel at which an image is displayed.

The image pickup unit 200 is disposed on the non-display area NDA, and a lens of the image pickup unit 200 may be disposed facing a same direction as a display surface of the notebook computer 10. The lens is designed to be connected to an LCD and thus to allow an image captured by the image pickup unit 200 to be displayed through the display area DA of the display panel DP.

An exemplary embodiment of an LCD according to the invention will hereinafter be described.

FIG. 2 is an exploded perspective view of an exemplary embodiment of LCD according to the invention. FIG. 3 is a cross-sectional view taken along line III-III' of FIG. 2.

Referring to FIGS. 2 and 3, an LCD 100 includes a container 130, a light source module 530, a light guide plate 510, a reflective plate 520, a mold frame 400, optical sheets 600, a display panel DP, a camera 210 and a cover 800.

The display panel DP may be provided as a rectangular plate with two pairs of parallel sides. The display panel DP includes a first display substrate 310 and a second display substrate 320.

The first display substrate 310 and the second display substrate 320 are disposed to face each other. The first display substrate 310 may be a display element substrate, and the second display substrate 320 may be a color filter substrate. However, the invention is not limited to this.

An image input hole 330 is provided in a non-display area of the first display substrate 310. Portions of the display substrate 310 may define the image input hole 330. The camera 210 may extended into the image input hole 330 such that the input image hole may otherwise be referred to as a camera hole 330. The camera hole 330 may be covered (e.g., overlapped) by the second display substrate 320.

The container 130 may accommodate therein the light source module 530, the light guide plate 510, the reflective plate 520, the optical sheets 600, the mold frame 400, the display panel DP and the camera 210. The container 130 may include or be formed of a metal or a plastic material.

The container 130 includes a storage space defined by sidewalls 110 and a bottom portion 120. The storage space may have a size capable of properly supporting the light source module 530, the light guide plate 510, the reflective plate 520, the optical sheets 600, the mold frame 400, the display panel DP and the camera 210 such that movement of these elements is restricted within the storage space once they are stored in the container 130, and for this, the sidewalls 110 and the bottom portion 120 may be provided. The top of the container 130 is covered by the cover 800. For this, the size of the container 130 may be smaller than the size of the cover 800.

The light source module 530 includes a light source 532 provided in plural and which generates light, and a circuit board 534 which is connected to the light sources 532 and transmits a light source driving signal to the light sources 532. The circuit board 534 is connected to a light source driving unit (not shown) via a connecting line (not shown). The light source driving signal, which is provided by an external source (not shown), may be provided to the circuit board 534 via the connecting line, and may then be applied to each of the light sources 532 via the circuit board 534. Examples of the light sources 532 may include light-emitting diodes ("LEDs") but the invention is not limited thereto.

The light source module 530 may be disposed near the sidewalls 110 of the container 130.

The light guide plate 510 is disposed to face the light source module 530 in a direction in which the light source module 530 emits light. The light guide plate 510 may be disposed to overlap the display panel DP, and the light source module 530 may be disposed at or near one side of the light guide plate 510.

Light generated and provided by the light source module 530 is supplied into the light guide plate 510 through a light-incident surface of the light guide plate 510, and is emitted toward the optical sheets 600 through a light-emitting surface of the light guide plate 510. The reflective plate 520 is disposed to face a bottom surface of the light guide plate 510, which is opposite to the light-emitting surface of the light guide plate 510.

An edge-type LCD in which the light source module 530 is disposed on a side of the light guide plate 510 has been described as an example of the LCD in the present exemplary embodiment, but the invention is also applicable to a direct-type LCD in which the light guide plate 510 is excluded and the light source module 530 is disposed on the bottom portion 120 of the container 130.

The mold frame 400 includes a body portion 410 and a support portion 420. The mold frame 400 may include or be formed of a plastic material. The body portion 410 consists substantially of four sidewalls disposed inclined such as perpendicular to the bottom portion 120 of the container 130, and the support portion 420 which protrudes from each of the sidewalls of the body portion 410 toward a corresponding opposite sidewall. The light source module 530, the light guide plate 510 and the reflective plate 520 may be disposed below the support portion 420, and may thus be fixed by the container 130. The display panel DP is disposed above the support portion 420 and is thus supported by the support portion 420.

The cover 800 may be disposed on the display panel DP, and may surround and cover the sides and upper peripheral edges of the display panel DP. The cover 800 may be formed as a rectangular frame. The display panel DP may be fixed with the LCD 100 by coupling the cover 800 and the container 130 together.

A camera window 810 may be defined at the cover 800. The camera window 810 may be a hole defined penetrating the cover 800 or a light-transmitting window of a material through which light is transmitted. In an exemplary embodiment, for example, the cover 800 may include or be formed of a colored material, and the camera window 810 may be a transparent glass or plastic material disposed in the cover 800. The camera window 810 of the cover 800 is disposed to overlap the camera hole 330 in the first display substrate 310.

The camera 210 may include a lens and a printed circuit board ("PCB") on which the lens is mounted. The PCB may be connected to an external driver via a flexible film. The camera 210 may be fixed onto the support portion 420 of the mold frame 400 such as via an adhesive member (not illustrated). Examples of the adhesive member include an adhesive tape, but the invention is not limited thereto. The camera 210 is inserted and fixed in the camera hole 330 of the first display substrate 310 by being fixed by the mold frame 400. The top (e.g., distal end) of the camera 210 may be covered and protected by the second display substrate 320.

The camera 210 may extend through the camera hole 330 of the first display substrate 310 of the display panel DP, and may capture and image light input thereto via the camera window 810 of the cover 800.

FIG. 4 is an enlarged cross-sectional view of the display panel DP excluding the camera hole 330 in area A of FIG. 3. The location of a dummy wire 290 on the display panel DP before the formation of the camera hole 330 will hereinafter be described with reference to FIG. 4.

Referring to FIG. 4, the first display substrate 310 includes a first insulating substrate 311, the dummy wire 290 and a gate electrode 273, which are disposed on the first insulating substrate 311, a passivation layer 281 which is disposed on the dummy wire 290 and the gate electrode 273, a protective layer 280 which is disposed on the passivation layer 281 and a pixel electrode 278.

The second display substrate 320 includes a second insulating substrate 321, a light-shielding pattern 220 provided in plural, an overcoat layer 227 which is disposed on the light-shielding patterns 220, and a common electrode 250 which is disposed on the overcoat layer 227.

A liquid crystal layer 200, a sealant 260 provided in plural and which seals the liquid crystal layer 200 within the display panel DP, and a spacer 270 which may be cylindrical in shape, are each provided between the first insulating substrate 311 and the second insulating substrate 321 to be interposed between the first display substrate 310 and the second display substrate 320.

The first insulating substrate 311 and the second insulating substrate 321 may include or be formed of an insulating material. More specifically, the first insulating substrate 311 and the second insulating substrate 321 may include an insulating material such as transparent glass, quartz, ceramic, silicon, transparent plastic and the like, but the invention is not limited thereto.

A plurality of signal lines is disposed on the first insulating substrate 311 and may drive each pixel of the display panel DP. Among the signal lines, the gate electrode 273 which is branched off from a gate line (not shown), may be disposed on the first insulating substrate 311 and may define a gate wiring on the first substrate 311. The dummy wire 290 may include or be formed of the same material as the gate electrode 273 and may be disposed on the same level (e.g., in a same layer) of the first display substrate 310 as the gate electrode 273 among layers disposed on the first insulating substrate 311. The gate electrode 273 and the dummy wire 290 may include or be formed of an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), titanium (Ti), tantalum (Ta), or the like.

A gate insulating layer 279 may be disposed on the gate electrode 273 and the dummy wire 290. Among the above-described signal lines, a source electrode 277 which is branched off from a data line (not shown) and a drain electrode 276, may be disposed on the gate insulating layer 279 and may define a data wiring on the first substrate 311. The dummy wire 290 may include or be formed of the same material as the source and drain electrodes 277 and 276 and may be disposed on the same level (e.g., in a same layer) of the first display substrate 310 as the source and drain electrodes 277 and 276 among layers disposed on the first insulating substrate 311.

The gate insulating layer 279 may be disposed between the gate electrode 273 and the source and drain electrodes 277 and 276. The gate insulating layer 279 may insulate the gate electrode 273 from the source and drain electrodes 277 and 276 so as not to allow a gate signal applied to the gate electrode 273 to be applied to the source and drain electrodes 277 and 276. The gate insulating layer 279 may include or be formed of, for example, silicon nitride (SiNx), silicon oxide ($SiO_2$), silicon oxynitride (SiON), or a deposition layer thereof.

A semiconductor layer 274 and an ohmic contact layer 275 are disposed on the gate insulating layer 279. The semiconductor layer 274 may include or be formed of, for example, hydrogenated amorphous silicon, polycrystalline silicon, an oxide semiconductor, or the like. The semiconductor layer 274 may form a driving element such as a thin-film transistor ("TFT") together with the gate electrode 273, a source electrode 277 and a drain electrode 276. A channel of the TFT may be formed at a portion of the semiconductor layer 274 exposed between the source and drain electrodes 277 and 276.

In response to a gate signal being applied to the gate electrode 273, a data voltage applied to the source electrode 277 is applied to the drain electrode 276, and is then applied to the pixel electrode 278 via the drain electrode 276. The pixel electrode 278 is connected to and contacts the drain electrode 276 at a contact hole defined in layers of the first display substrate 310, such as in the passivation layer 281 and the protective layer 280.

The passivation layer 281 may be disposed on the source and drain electrodes 277 and 276. The passivation layer 281 may include or be formed of SiNx, $SiO_2$, SiON, or a deposition layer thereof.

The protective layer 280 is disposed on the passivation layer 281 and may remove any step differences in the passivation layer 281 by planarizing the passivation layer 281. The protective layer 280 may include or be formed of a transparent organic layer.

The second insulating substrate 321 may include a color filter layer 211 which realizes a color in each pixel in the display area DA. The color filter layer 211 may be configured to provide colors such as red, blue and green in the pixels of the display area DA. A color filter provided in plural and rendering different colors may be disposed to form the color filter layer 211 such as being disposed at adjacent pixels within the display area DA. The light-shielding patterns 220 may be disposed between pixels in the display area DA. Each of the light-shielding patterns 220 may include or be formed of an organic film containing a black pigment or dye. The light-shielding patterns 220 may impart a light-shielding effect by absorbing most of the light incident thereupon. In some exemplary embodiments, each of the light-shielding patterns 220 may include or be formed as a collective stack of a metal film and a black organic film.

The light-shielding patterns 220 may include an opening 221 defined therein, from which a material of the light-shielding patterns 220 is partially removed in an area facing the first insulating substrate 311 where the camera hole 330 is disposed. Since the light-shielding patterns 220 block light, without the opening 221 in the light shielding patterns 220, light would be blocked from proceeding to the camera 210 which is to be inserted into the camera hole 330, and thus would make the camera 210 unable to function properly. The light-shielding patterns 220 may be formed on the entire surface of the non-display area NDA except for the opening 221.

The overcoat layer 227 may be disposed on the light-shielding patterns 220. The overcoat layer 227 is disposed to cover the light-shielding patterns 220 and the entire surface of the second insulating substrate 321. The overcoat layer 227 removes any step differences caused by the light-shielding patterns 220 and thus planarizes the second insulating substrate 321. The overcoat layer 227 may include or be formed as a transparent organic film.

The common electrode 250 may be disposed on the overcoat layer 227 and on the entire second insulating substrate 321. The common electrode 250 may include or be formed of a transparent material such as indium zinc oxide ("IZO") or indium tin oxide ("ITO"). A common voltage is applied to the common electrode 250, and as a result, the common electrode 250 generates an electric field together with the pixel electrode 278, thereby driving the liquid crystal molecules in the liquid crystal layer 200.

The liquid crystal layer 200 is disposed between the first insulating substrate 311 and the second insulating substrate 321 to be interposed between the first display substrate 310 and the second display substrate 320. The sealants 260 which seal the liquid crystal layer 200 within the display panel DP, are disposed along sides of a region where the liquid crystal layer 200 is disposed. Two sealants 260 may be provided spaced apart from each other in a direction from the display area DA to the non-display area NDA. In an exemplary embodiment, one sealant 260 may be disposed along the boundary between the display area DA and the non-display area NDA (right sealant 260 in FIG. 4) and another sealant 260 may be disposed along peripheral sides of the non-display area NDA (left sealant 260 in FIG. 4), but the invention is not limited thereto.

The spacer 270 is disposed between the sealants 260, and maintains a cell gap between layers on the first insulating substrate 311 and layers on the second insulating substrate 321. Although not shown in the drawings, the spacer 270 may be provided not only in the non-display area NDA, but also in the display area DA. The spacer 270 may be cylindrical in shape, and may include or be formed of a transparent material. More specifically, in consideration that the lens of the camera 210 to be inserted into the camera hole 330 is to be disposed to face the spacer 270, the spacer 270 may include or be formed of a transparent material in an area where the camera hole 330 is provided, and may be formed of a non-transparent (e.g., colored material) in an area where the camera hole 330 is not provided.

FIG. 5 is a flowchart illustrating an exemplary embodiment of a manufacturing method of an LCD, according to the invention.

The display panel DP may be fabricated by, for example, a method that will hereinafter be described with reference to FIG. 5.

Referring to FIG. 5, the first display substrate 310, which includes TFTs, and the second display substrate 320 are fabricated (S100). An alignment film is formed on each of the first and second display substrates 310 and 320 (S110). A spacer is formed along the sides of the non-display area NDA of the first insulating substrate 311, and a sealant 260 is applied (S120) on the first insulating substrate 311. A liquid crystal material is dropped onto the display area DA of the first display substrate 310 (S130), the second display substrate 320 is transferred such as using a vacuum hose and is arranged to face the first display substrate 310, and the first and second display substrates 310 and 320 are bonded together (S140). As the sealant 260 is cured, the bonding between the first and second display substrates 310 and 320 may become stronger.

Once the first and second display substrates 310 and 320 are bonded together, a thickness within the first display substrate 310 in which the camera hole 330 is to be formed may be measured (S150). The camera hole 330 is formed to a depth corresponding to the measured thickness within the first display substrate 310 (S160). The camera 210 is inserted into the formed camera hole 330 (S170). Thereafter, a driving circuit is attached (S180), and a backlight and a case are assembled together (S190), thereby completing the fabrication of the display panel DP.

An exemplary embodiment of method of forming the camera hole 330 in the first display substrate 310 will hereinafter be described with reference to FIGS. 6 to 8.

A camera hole forming apparatus 700 is prepared. With reference to the structure of FIG. 3, a thickness within the first display substrate 310 may be measured using the camera hole forming apparatus 700.

The camera hole forming apparatus 700 includes a laser beam irradiator 710 which outputs a laser beam, a laser receiver 730 which measures a reflected laser beam, a thickness measurer 740 which measures a total thickness of the first insulating substrate 311 within the first display substrate 310 based on the reflected laser beam, and an incising tool such as a drill 720 which defines the camera hole 330 in the first insulating substrate 311 to a depth corresponding to the total thickness of the first insulating substrate 311 measured by the thickness measurer 740. The camera hole forming apparatus 700 may also include a central location estimator (not illustrated), which estimates a central location of the camera hole 300 with respect to the first insulating substrate 311.

Referring to FIG. 6, the camera hole forming apparatus 700 places the laser beam irradiator 710 near a bottom surface of the first insulating substrate 311 at a location where the dummy wire 290 is formed on the first insulating substrate 311. Thereafter, the laser receiver 730 determines a general location of the dummy wire 290 by measuring a reflected laser beam initially output by the laser beam irradiator 710. Once the location of the dummy wire 290 is determined, the laser beam irradiator 710 outputs a laser beam again to be reflected from the dummy wire 290 (refer to opposing arrows in FIG. 6).

The thickness measurer 740 may measure a total thickness of the first insulating substrate 311 based on the wavelength and intensity of the laser beam reflected from the dummy wire 290. The dummy wire 290 includes or is formed of an opaque metal and thus has a relatively high reflectivity. Accordingly, light output by the laser beam irradiator 710 is reflected from the dummy wire 290, and the reflected light is measured by the laser receiver 730. The laser receiver 730 may measure the wavelength and intensity of the reflected light. The thickness measurer 740 may determine a total thickness of the first insulating substrate 311 by comparing the wavelength and intensity of the reflected light, measured by the laser receiver 730, with the wavelength and intensity of the light output by the laser beam irradiator 710.

It will hereinafter be described how the camera hole forming apparatus 700 drills the camera hole 330 in the first insulating substrate 311 with reference to FIG. 7.

The drill 720 may be placed at a location along the first display substrate 310 at which the camera hole 330 is to be formed, and may form an incision 331 in the first insulating substrate 311 (refer to FIG. 8) for forming the camera hole 330, so as to drill the camera hole 330 in the first insulating substrate 311. The drill 720 is sharp enough to penetrate the first insulating substrate 311 of the first display substrate 310. The incision 331 for forming the camera hole 330 may be defined by inserting the drill 720 into the thickness of the first insulating substrate 311. The drill 720 may be inserted into the first insulating substrate 311 while rotating (refer to circular arrow in FIG. 7) about a center of the camera hole 330 to be formed, where the center is defined by a shape of the camera hole 330. The depth to which the camera hole forming apparatus 700 is inserted into the first insulating substrate 311 by rotating the drill 720 may be set to the total thickness of the first insulating substrate 311.

FIG. 8 is a cross-sectional view of a display panel including the incision 331, which is formed by a drilling process as illustrated in FIG. 7, and FIG. 9 is a bottom plan view of area I of FIG. 8.

A separation process for forming the camera hole 330 after the formation of the incision 331 will hereinafter be described with reference to FIGS. 8 and 9.

At the incision 311, a material of the first insulating substrate 311 remains attached to other layers of the first display substrate 310.

A member such as tape with relatively strong adhesive strength is attached onto a bottom of the material of the first insulating substrate 311 where the incision 331 is formed. More specifically, the tape is attached onto the first insulating substrate 311 where the incision 331 is formed, and then force is applied in a direction away from the other layers of the first display substrate 310. As such, tensile strength applied to the tape may also be applied to the material of the first insulating substrate 311 at the incision 331 due to the tape's adhesion to the material of the first insulating substrate 311 at the incision 331. Since the incision 331 is formed in the first insulating substrate 311, only the material of the first insulating substrate 311 within the incision 331 is separated. As a result of this separation process, the camera hole 330 may be formed in the first insulating substrate 311.

The camera hole 330 may be partially exposed below the spacer 270. The dummy wire 290 may also be separated from the first insulating substrate 311 during the separation process performed on the incision 331.

The incision 331 may be formed to a depth Ta corresponding to the total thickness of the first insulating substrate 311. Even though the incision 331 is illustrated as formed to the depth Ta, in an exemplary embodiment, the camera hole 330 may be formed to a depth Ta+Tb. Since the dummy wire 290, the passivation layer 281 and the organic layer 280 are attached to one another to form a collective layer, a portion of the dummy wire 290, the passivation layer 281 and/or the organic layer 280 may also be removed from the first display substrate 310 during the separation process performed on the material of the first insulating substrate 311 at the incision 331 in the first insulating substrate 311.

When the dummy wire 290 is located at the center of the incision 331, the dummy wire 290 may be removed from the first display substrate 310 due to the formation of the camera hole 330. Accordingly, with the dummy wire 290 removed, the dummy wire 290 may not affect the camera 210.

Forming the camera hole 330 in the first display substrate 310 includes determining the total thickness of the first insulating substrate 311. Even though first insulating substrates are fabricated by the same manufacturing method, they may have slightly different thicknesses from one another once they are subjected to the formation of driving elements such as TFTs thereon. Thus, with thickness variation of the first insulating substrates, there is a risk that the incision 331 may be formed deeper than the thickness of the first insulating substrate 311 so as to undesirably cause damage to the lower layers of the display panel DP, or may be formed too shallow to properly form the camera hole 330 leaving some material of the first insulating substrate 311 at the cameral hole 330 unremoved.

However, if the actual total thickness of the first insulating substrate 311 is determined and then the camera hole 330 is formed in the first insulating substrate 311 based on the actual determined thickness, the defect rate of the display panel DP may be reduced. A display panel DP with too deep or too shallow a camera hole cannot be repaired, causing excessive waste. Thus, accurately determining the actual thickness of the first insulating substrate 311 before forming the camera hole 330, particularly at a place where the camera hole 330 is to be formed, would reduce unnecessary waste.

In a plan view, the spacer 270 may be larger in size than the camera hole 330 and may be disposed to completely cover the camera hole 330. That is, edges of the spacer 270 extend further than edges of the cameral hole 330. The spacer 270 is formed as a cylinder, and may be circular in a bottom plan view. The planar area of the spacer 270 may be larger than the planar area of the camera hole 330, and the camera hole 330 may be disposed such that an entire planar area thereof is included inside the planar area of the spacer 270.

Light leaked from the display area DA at sides of the display panel DP may be undesirably incident on the camera 210. To reduce or effectively prevent light leaked at the sides of the display panel DP from being captured by the camera 210, the sealants 260 disposed at opposing sides of the camera hole 330 may include a black pigment material.

FIG. 10 is a cross-sectional view of another exemplary embodiment of a display panel DP which includes a first dummy wire 291, according to the invention, and FIG. 11 is a bottom plan view of area I of FIG. 10.

Referring to FIGS. 10 and 11, in an LCD 101, the first dummy wire 291 may be disposed in the form of a ring shape along a camera hole 330. Thus, a distance 'a' between an outer edge of the camera hole 330 (indicated by incision 331) and an outer edge of the first dummy wire 291 may be uniform in the bottom plan view.

In an exemplary embodiment of forming the camera hole 330, the camera hole forming apparatus 700 may form the incision 331 to be spaced from the first dummy wire 291 by the distance 'a'. Thus, the camera hole forming apparatus 700 may form the incision 331 for forming the camera hole 330 by rotating along a center defined by a shape of the first dummy wire 291.

A portion of the first dummy wire 291, like the dummy wire 290 described above, may be removed from a first insulating substrate 311 during a separation process which follows the formation of the incision 331, but the invention is not limited thereto.

FIG. 12 is a cross-sectional view of still another exemplary embodiment of a display panel DP which includes a second dummy wire 292 according to the invention. FIG. 13 is a bottom plan view of area I of FIG. 12.

Referring to FIGS. 12 and 13, a second dummy wire 292 is formed outside of an incision 331 for forming a camera hole 330. Thus, the second dummy wire 292 may remain in an LCD 102 even after the formation of the camera hole 330.

The second dummy wire 292 may be disposed near the incision 331, and the outer edge shape of the second dummy wire 292 may differ from the outer edge shape of the camera hole 330. An outer edge of the camera hole 330 may be separated from an inner edge of the second dummy wire 292, but the invention is not limited thereto.

Accordingly, the second dummy wire 292 may still be located near an outer edge of the camera hole 330 even after the formation of the camera hole 330, and may form a closed curve along the boundary of the camera hole 330. In an exemplary embodiment of forming the camera hole 330, a portion of the second dummy wire 292 may remain, even after the insertion of a camera 210 in the camera hole 330, to fix the camera 210 within the display panel DP.

FIG. 14 is a plan view of yet another exemplary embodiment of a display panel DP third dummy wires 293 according to the invention and illustrates the relationship between the third dummy wires 293 and a camera hole 330 of the display panel DP.

Referring to FIG. 14, a third dummy wire 293 may be provided in plural separated from each other. The third dummy wires 293 may be disposed along an outside of a camera hole 330. The third dummy wires 293 are spaced from the center of the camera hole 330 by the same distance, e.g., a distance R (refer to FIG. 9). Accordingly, the center of the camera hole 330 may be determined based on collective locations of the third dummy wires 293.

FIGS. 15 to 17 are schematic views illustrating an exemplary embodiment of a process of determining the center of the camera hole 330 of the display panel DP based on the collective locations of the third dummy wires 293 in FIG. 14.

The camera hole forming apparatus 700 may recognize the individual and collective locations of the third dummy wires 293, as illustrated in FIG. 15. The camera hole forming apparatus 700 may be equipped with as many laser beam irradiators 710 as there are third dummy wires 293. The laser beam irradiators 710 of the camera hole forming apparatus 700 irradiate laser beams over the third dummy wires 293, may measure reflected laser beams, and may be fixed over an area where a predefined number of the third dummy wires 293 are measured.

Alternatively, the camera hole forming apparatus 700 may be equipped with a single laser beam irradiator 710, and may detect the locations of the third dummy wires 293, as illustrated in FIG. 15, based on the locations where laser beams are respectively measured.

The camera hole forming apparatus 700 may mark dots $d_1$, $d_2$, $d_3$ and $d_4$ at the respective locations of the third dummy wires 293.

The camera hole forming apparatus 700 may determine virtual or literal lines each connecting a pair of diagonally opposite points among the dots $d_1$, $d_2$, $d_3$ and $d_4$, and may determine an intersection S between the two lines as the center of the camera hole 330.

More specifically, referring to FIG. 16, the intersection S between a line connecting the dots $d_1$ and $d_3$ that are diagonally opposite to each other and a line connecting the dots $d_2$ and $d_4$ that are diagonally opposite to each other may be determined as the center of the camera hole 330. The camera hole forming apparatus 700 places the drill 720 below the first insulating substrate 311 at a location along the first insulating substrate 311 the distance R apart from the intersection S. As a result, the camera hole 330 is formed, as illustrated in FIG. 17.

FIG. 18 is a plan view of yet another exemplary embodiment of a display panel DP including fourth dummy wires 294 according to the invention and explains the relationship between the fourth dummy wires 294 and a camera hole 330 of the display panel DP.

Referring to FIG. 18, the fourth dummy wires 294 may be disposed at different distances from the center of a camera hole 330. The method as illustrated in FIGS. 15 to 17 may be used to calculate an intersection S, e.g., the center of the camera hole 330, based on the collective arrangement of the fourth dummy wires 294. Even though the fourth dummy wires 294 are not the same distance apart from the center of the camera hole 300, the center of the camera hole 300 may be easily determined based on the individual and collective locations of the fourth dummy wires 294 because each pair of diagonally opposite fourth dummy wires 294 are spaced from the center of the camera hole 330 by the same distance.

What is claimed is:

1. A display device, comprising:
    a display panel comprising:
        an insulating substrate,
        a plurality of wires disposed on the insulating substrate,
        a light-shielding pattern, and
        an insulating layer between the wires and the light-shielding pattern,
        wherein the light-shielding layer has a plurality of openings; and
    a camera coupled to the display panel,
    wherein the camera overlaps one of the openings of the light-shielding layer, and
    wherein the one of the openings which is overlapped by the camera further overlaps both the insulating layer and some of the plurality of wires.

2. The display device of claim 1, wherein
    the some of the plurality of wires overlap with the camera in a plan view, and
    the some of the plurality of wires comprises an opaque conductive material.

3. The display device of claim 2, further comprising:
    an organic insulating layer on the wires, and
    the insulating layer provided in plural including a plurality of insulating layers between the organic insulating layer and the wires.

4. The display device of claim 3,
    wherein the some of the plurality of wires which overlap the one of the openings of the light-shielding layer form a closed shape comprising an opening interior thereto in the plan view, and
    wherein the opening of the closed shape overlaps with the camera in the plan view.

5. The display device of claim 4, further comprising a transistor including a gate electrode, a source electrode and a drain electrode,
    wherein the transistor is electrically connected to one of the plurality of wires.

6. The display device of claim 5, further comprising a spacer disposed on the organic insulating layer and disposed over the camera.

7. The display device of claim 6, further comprising an overcoat layer disposed over the spacer.

8. The display device of claim 7, wherein the plurality of wires are formed of a same material as the gate electrode or the drain electrode.

9. The display device of claim 4, further comprising a plurality of color filters overlapping the plurality of insulating layers in the plan view.

10. The display device of claim 9, further comprising a spacer disposed on the organic insulating layer and disposed over the camera.

11. The display device of claim 10, further comprising an overcoat layer disposed over the spacer.

12. The display device of claim 4, wherein:
    the insulating substrate has a hole, and
    the camera is inserted in the hole.

13. The display device of claim 12, further comprising a spacer disposed on the organic insulating layer and disposed over the camera.

14. The display device of claim 13, further comprising an overcoat layer disposed over the spacer.

15. The display device of claim 14, further comprising a sealant surrounding the spacer.

16. The display device of claim 12, further comprising a plurality of color filters overlapping the plurality of insulating layers in the plan view.

17. The display device of claim 16, further comprising a spacer disposed on the organic insulating layer and disposed over the camera.

18. The display device of claim 17, further comprising an overcoat layer disposed over the spacer.

19. The display device of claim 18, further comprising a sealant surrounding the spacer.

20. The display device of claim 19, wherein the some of the plurality of wires are isolated from some other of the plurality of wires.

* * * * *